US007062683B2

(12) United States Patent
Warpenburg et al.

(10) Patent No.: US 7,062,683 B2
(45) Date of Patent: Jun. 13, 2006

(54) TWO-PHASE ROOT CAUSE ANALYSIS

(75) Inventors: Michael R. Warpenburg, Austin, TX (US); Michael J. Scholtes, Austin, TX (US)

(73) Assignee: BMC Software, Inc., Houston, TX (US)

( * ) Notice: Subject to any disclaimer, the term of this patent is extended or adjusted under 35 U.S.C. 154(b) by 541 days.

(21) Appl. No.: 10/420,174

(22) Filed: Apr. 22, 2003

(65) Prior Publication Data

US 2004/0225927 A1 Nov. 11, 2004

(51) Int. Cl.
*G06F 11/00* (2006.01)

(52) U.S. Cl. .............................. 714/43; 714/27; 714/56

(58) Field of Classification Search .................. 714/26, 714/27, 56

See application file for complete search history.

(56) References Cited

U.S. PATENT DOCUMENTS

| | | | | |
|---|---|---|---|---|
| 5,504,921 | A * | 4/1996 | Dev et al. | 709/223 |
| 6,006,016 | A * | 12/1999 | Faigon et al. | 714/48 |
| 6,072,777 | A | 6/2000 | Bencheck et al. | |
| 6,249,755 | B1 | 6/2001 | Yemini et al. | |
| 2002/0086671 | A1* | 7/2002 | Amin et al. | 455/432 |
| 2003/0051195 | A1* | 3/2003 | Bosa et al. | 714/43 |

OTHER PUBLICATIONS

BMC Software, Inc. Product Review. Roy, Gerry and Tracy Luciani. "A Modeling Approach to Root-cause Analysis: New Product Review: PATROL® for Diagnostic Management." www.bmc.com/technews/002/root.html. Dec. 2002. 12 pages.

(Continued)

*Primary Examiner*—Scott Baderman
*Assistant Examiner*—Joshua Lohn
(74) *Attorney, Agent, or Firm*—Wong, Cabello, Lutsch, Rutherford & Brucculeri, LLP

(57) ABSTRACT

A two-phase method to perform root-cause analysis over an enterprise-specific fault model is described. In the first phase, an up-stream analysis is performed (beginning at a node generating an alarm event) to identify one or more nodes that may be in failure. In the second phase, a down-stream analysis is performed to identify those nodes in the enterprise whose operational condition are impacted by the prior determined failed nodes. Nodes identified as failed as a result of the up-stream analysis may be reported to a user as failed. Nodes identifies as impacted as a result of the down-stream analysis may be reported to a user as impacted and, beneficially, any failure alarms associated with those impacted nodes may be masked. Up-stream (phase 1) analysis is driven by inference policies associated with various nodes in the enterprise's fault model. An inference policy is a rule, or set of rules, for inferring the status or condition of a fault model node based on the status or condition of the node's immediately down-stream neighboring nodes. Similarly, down-stream (phase 2) analysis is driven by impact policies associated with various nodes in the enterprise's fault model. An impact policy is a rule, or set of rules, for assessing the impact on a fault model node based on the status or condition of the node's immediately up-stream neighboring nodes.

90 Claims, 8 Drawing Sheets

OTHER PUBLICATIONS

Gensym Corporation. "Integrity SymCur Developer's Guide Version 3.1." Sep. 2000. 20 pages.

Micromuse Inc. White Paper. "The Netcool®/OMNIbusTM System Architecture." Mar. 2002. 14 pages.

Micromuse Inc. White Paper. "Precise Root Cause Analysis: Taking the Guesswork Out of Solving Network Faults and Failures." Jul. 2002. 14 pages.

Smarts Corporation White Paper. "Downstream Suppression is Not Root Cause Analysis." Oct. 2002. 13 pages.

* cited by examiner

```
CLASS ATM;
CLASS ATM_SRVC;
CLASS VSAT;
CLASS BINDER NEEDS ATM;

RELATION VSAT_SRVS{
    //SYNTAX: <ROLE NAME>:<CLASS NAME>
    VSAT_NODE:VSAT;
    ATM:ATM;
}

RELATION COMPOSES{
    ATMSERVICE:ATM_SRVC;
    ATM:ATM;
}

RELATION HAS_MONEY_IN{
    BINDER:BINDER
    ATM:ATM;
}
```

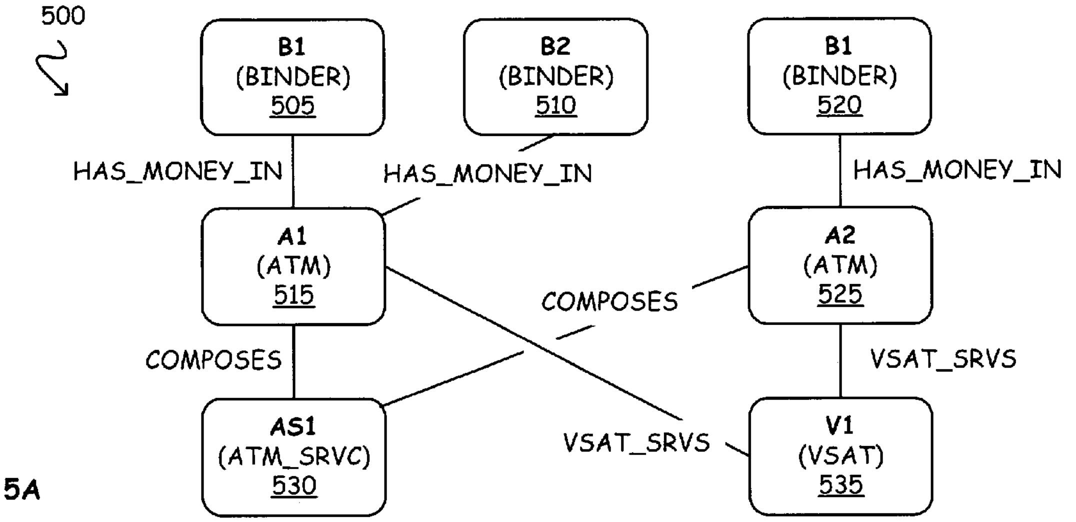

FIG. 5A

```
INSTANCE "A1" OF ATM{}
INSTANCE "A2" OF ATM{}
INSTANCE "B1" OF BINDER{
        ATM = "A1";
}
INSTANCE "B2" OF BINDER{
        ATM = "A1";
}
INSTANCE "B1" OF BINDER{
        ATM = "A2";
}
INSTANCE "AS1" OF ATM_SERVICE{}
INSTANCE "V1" OF VSAT{}
RELATE USING COMPOSES{
        ATM_SRVC:ATM_SRVC = "AS1"
        ATM:ATM = "A1"
}
RELATE USING COMPOSES{
        ATM_SRVC:ATM_SRVC = "AS1"
        ATM:ATM = "A2"
}
RELATE USING HAS_MONEY_IN{
        ATM:ATM = "A1"
        BINDER:BINDER = "B1", ATM = "A1"
        BINDER:BINDER =  "B2", ATM = "A1"
}
RELATE USING HAS_MONEY_IN{
        ATM:ATM = "A2"
        BINDER:BINDER = "B1", ATM = "A2"
}
RELATE USING VSAT_SRVS{
        VSAT_NODE:VSAT ="V1";
        ATM:ATM = "A1";
        ATM:ATM = "A2";
}
```

FIG. 5B

```
FAULT_MODEL ATM_EXAMPLE {

        CONDITION BINDER.NO_MONEY {
                INFERENCE_POLICY ANY {}
        }

        CONDITION ATM_SRVC.DEGRADED {

                IMPACT_POLICY PERCENTAGE {
                        THRESHOLD = 30;
                        NODES ATM.DOWN;
                }

                IMPACT_POLICY PERCENTAGE {
                        THRESHOLD = 50;
                        NODES ATM.NO_MONEY;
                }

                IMPACT_POLICY PERCENTAGE {
                        THRESHOLD = 50;
                        NODES ATM.PAPER_JAM;
                }
        }

        CONDITION ATM_SRVC.DOWN {
                IMPACT POLICY ALL {}

                CONDITION ATM.NO_MONEY {
                        IMPACT_POLICY COUNT( THRESHOLD = 2;)
                }

                INFERENCE_POLICY PERCENTAGE( THRESHOLD = 50;)
        }
}
```

FIG. 6B

TWO-PHASE ROOT CAUSE ANALYSIS

BACKGROUND

The invention relates generally to the field of event detection and fault diagnosis for computer systems and, more particularly but not by way of limitation, to techniques (devices and methods) for defining and using fault models for the monitoring, diagnosis and recovery of error conditions in a enterprise computing system.

Contemporary corporate computer networks comprise a plurality of different computer platforms and software applications interconnected through a number of different paths and various hardware devices such as routers, gateways and switches. workstations, dedicated file, application and mail servers and mainframe computer systems. Illustrative software applications include accounting, payroll, order entry, inventory, shipping and database applications. The collection of such entities—hardware and software—is often referred to as an "enterprise."

As enterprises have become larger and more complex, their reliability has become ever more dependent upon the successful detection and management of problems that arise during their operation. Problems can include hardware and software failures, hardware and software configuration mismatches and performance degradation due to limited resources, external attacks and/or loss of redundancy. Operational problems generate observable events, and these events can be monitored, detected, reported, analyzed and acted upon by humans or by programs. It has been observed that as an enterprise grows (i.e., incorporates more monitored components—hardware and software), the rate at which observable events occur increases dramatically. (Some studies indicate event generation rates increase exponentially with enterprise size.) Quickly and decisively identifying the cause of any given problem can be further complicated because of the large number of sympathetic events that may be generated as a result of an underlying problem(s). In the field of enterprise monitoring and management, the large number of sympathetic events that are generated as a result of one, or a few, underlying root cause failures, is often referred to as an "alert storm." For example, a router failure may generate a "router down" event and a large number of "lost connectivity" events for components that communicate through the failed router. In this scenario, the router failure is the fundamental or "root cause" of the problem and the lost connectivity events are "sympathetic" events. Studies have estimated that up to 80% of a network's down-time is spent analyzing event data to identify the underlying problem(s). This down-time represents enormous operational losses for organizations that rely on their enterprises to deliver products and services.

One prior art approach to enterprise diagnosis relies on user specified rules of the form: IF (CONDITION-A) AND/OR/NOT (CONDITION-B) . . . (CONDITION-N) THEN (CONDITION-Z). Known as a "rules-based" approach, these techniques monitor the enterprise to determine the sate of all tested conditions (e.g., conditions A, B and N). When all of a rule's conditions are true, that rule's conclusion state is asserted as true (e.g., condition-z). While this approach has the advantage of being easy to understand, it is virtually impossible to implement in any comprehensive manner for large enterprises. (The number of possible error states (i.e., combinations of conditions A, B . . . N) giving rise to a fault (e.g., conclusions), grows exponentially with the number monitored components.) In addition, rules-based approaches are typically tightly coupled to the underlying enterprise architecture such that any changes in the architecture (e.g., the addition of monitored components) requires changes (e.g., the addition of rules) to the underlying rule-set. Further, in a dynamic environment where monitored components are added and/or removed on a weekly or daily basis, rules-based approaches becomes nearly impossible to implement in a controlled and reliable manner because of the overhead associated with creating and/or modifying rules for each component added or the removal of one or more rules for each component removed.

Another prior art approach to enterprise diagnosis is known as "pattern matching." This approach also uses rules but, unlike the rules-based analysis introduced above, allows two-way reasoning through a rule-set. For example, if a rule of the form IF (CONDITION-A)AND (CONDITION-B) THEN (CONDITION-C) exists and both condition-A and condition-C are known to be true (e.g., through monitoring or measurement), these systems can infer that condition-B must also be true. This, in turn, may allow the satisfaction of additional rules. While more powerful and flexible than standard rules-based systems, pattern matching systems, like rules-based systems, must have all (or a sufficient number) of their error states defined a priori and are difficult to maintain in a dynamic environment.

Yet another prior art approach to enterprise diagnosis uses signed directed graphs (digraphs) to propagate enterprise variable status between different modeled nodes, where each node in such a model (a fault model) represents a condition of a modeled component in the enterprise. For example, a node in an enterprise fault model may represent that port-1 in router-A has failed or that Database Management Application-Z has less than a specified amount of working buffer memory available. Many digraph implementations use generic, class-level models of the monitored components in a classic object-oriented approach and, for this reason, are often referred to as Model Based Reasoning (MBR) techniques. Unlike rule-based systems, MBR systems provide a scalable method to identify and propagate detected error states to one or more "event correlation" engines. Event correlation engines, in turn, provide the computational support to analyze the myriad of event indications and to determine, based on preprogrammed logic, what a likely root-cause of the monitored events is. Heretofore, the ability to correlate error states in a highly dynamic environment and to account for the possibility of more than one simultaneous error or fault has stunted the ability of MBR systems to perform up to their theoretical limits. Accordingly, it would be beneficial to provide improved event correlation and analysis techniques for MBR systems.

SUMMARY

In one embodiment the invention provides an enterprise fault analysis method, where an enterprise includes a plurality of monitored components some of which may be hardware and some of which may be software. In various embodiments, the enterprise (or that portion of the enterprise being monitored) is represented by a fault model having a plurality of communicatively coupled nodes. The method includes receiving an event notification from a first node, performing an up-stream analysis of the fault model beginning at the first node, identifying a second node (the second node having a status value modified during the up-stream analysis to indicate a failed status), performing a down-stream analysis of the fault model beginning at the second node, identifying those nodes in a contiguous path between the second node and the first node whose impact values indicate an impacted performance condition in accordance with the down-stream analysis, reporting the second node as a root cause of the received event notification, and reporting at least one of the identified nodes as impacted by the root cause of the received event notification and not as root causes of the received event notification. The method may be stored in any media that is readable and executable by a computer system.

BRIEF DESCRIPTION OF THE DRAWINGS

FIGS. 5A and 5B present a Managed Object Inventory for the Management Schema of FIGS. 4A and 4B.

FIGS. 6A and 6B present a Fault Model for the Management Schema and Managed Object Inventory of FIGS. 4A, 4B, 5A and 5B.

DETAILED DESCRIPTION

Figure 1:
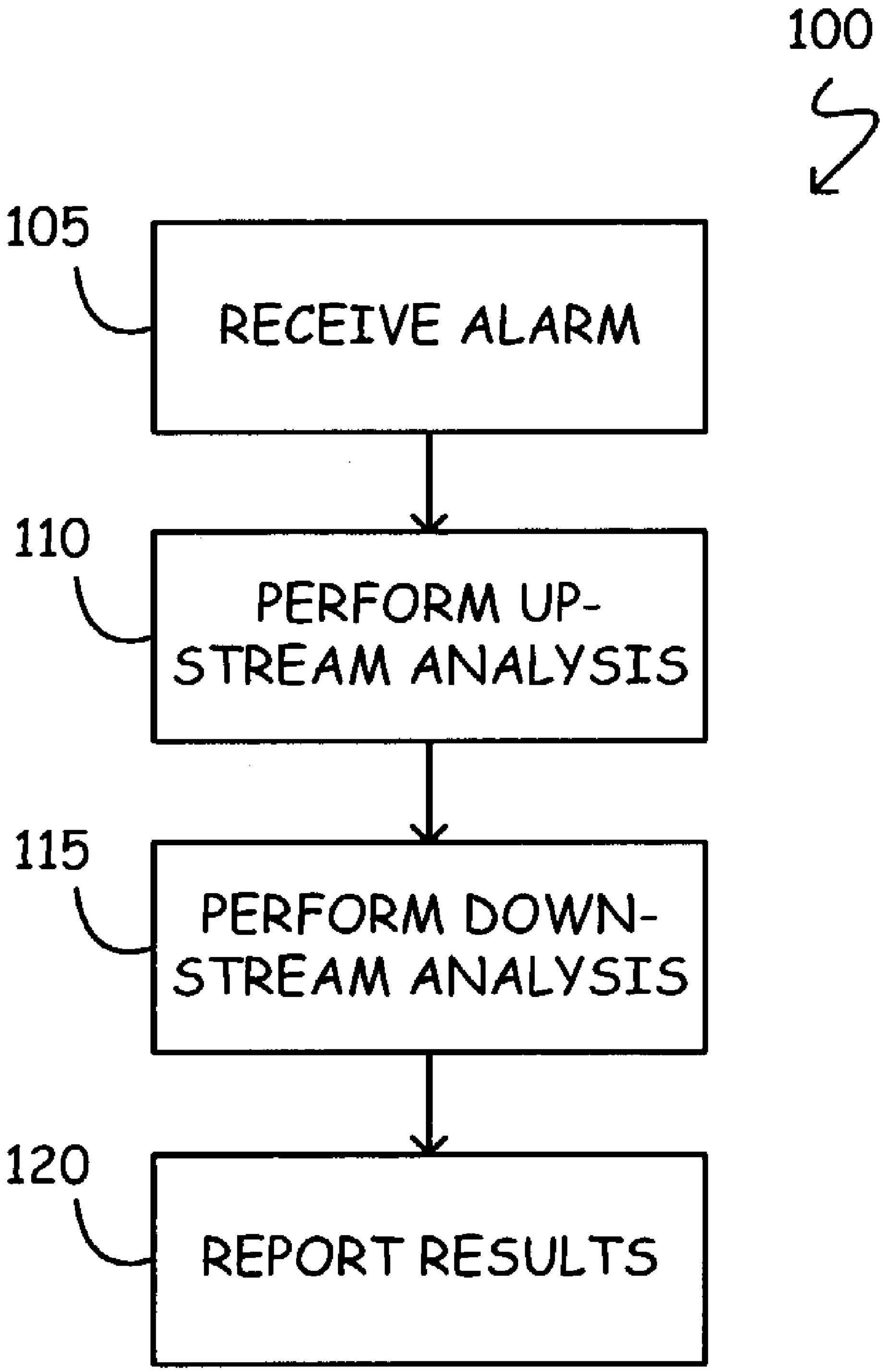
FIG. 1 shows, in flowchart form, an enterprise monitoring and analysis method in accordance with one embodiment of the invention.

The invention relates generally to the field of event detection and fault diagnosis for computer systems and, more particularly but not by way of limitation, to methods and devices for defining and using fault models for the monitoring, diagnosis and recovery of error conditions in an enterprise computing system.

The following embodiments of the invention, described in terms of model based reasoning approaches using object-oriented characterizations of monitored components, are illustrative only and are not to be considered limiting in any respect. Specifically, the following embodiments of the invention utilize an object-oriented modeling approach for characterizing: (1) monitored components; (2) their physical and/or logical connectivity and (3) the propagation of detected anomalies or faults. In this approach, each component (hardware, software and logical) that is to be monitored is defined by a software object that characterizes that object in terms of its function and possible relationships with other modeled objects. The collection of all such object definitions is referred to as the Management Schema. The topology or architecture of a specific enterprise comprising objects from the Management Schema is referred to as the Managed Object Inventory. The structure, organization or connectivity of the Managed Object Inventory may be specified by a user, determined automatically via auto-discovery techniques or by a combination of these approaches. Based on the Management Schema, a Fault Model (a directed graph or digraph) may be determined, wherein each node in the Fault Model represents a "condition" of a modeled component. Thus, if a single managed object (i.e., an object in the Management Schema) is characterized by a plurality of conditions, it may be represented by a plurality of nodes in a Fault Model. The topology or architecture of a specific Fault Model is referred to as an Impact Graph.

As described above, Management Schema and Fault Models are class-level entities. They define abstract objects (e.g., network routers and applications) in terms of what "conditions" those objects may be associated with and the allowable "relationships" between different objects. In contrast, Managed Object Inventories and Impact Graphs represent specific instances of a Management Schema and Fault Model respectively.

In accordance with object-oriented approaches to the invention, one or more nodes in an Impact Graph have an associated inference policy and/or impact policy. As used herein, an inference policy is a rule, or set of rules, for inferring the status or condition of a fault model node based on the status or condition of the node's immediately down-stream neighboring nodes, wherein a down-stream node is a node that is coupled to another (digraph) node in the direction of information flow. Similarly, an impact policy is a rule, or set of rules, for assessing the impact on a fault model node based on the status or condition of the node's immediately up-stream neighboring nodes, wherein an up-stream node is a node that is coupled to another (digraph) node in the direction against information flow. Typically, nodes in a fault model in accordance with the invention utilize a status value (e.g., a Boolean value to indicate whether a node is failed or not-failed, or a real number such as 0.0 to 1.0) to record a node's status or condition and an impact value (e.g., a Boolean value to indicate whether a node is impacted or not-impacted by its up-stream neighbors, or a real number such as 0.0 to 1.0) to record the node's impact value.

Referring to FIG. 1, a model based reasoning (MBR) approach 100 to enterprise monitoring and fault analysis in accordance with the invention uses a combination of up-stream analysis (based on the evaluation of inference policies) and down-stream analysis (based on the evaluation of impact policies) on an Impact Graph to efficiently and effectively identify and isolate root cause faults from the myriad of event notifications or alarms, many or most of which may be "sympathetic," that one or more underlying fault conditions may trigger. On event notification (block 105), an up-stream analysis of the Impact Graph beginning with the node receiving the event notification is performed (block 110). Up-stream analysis in accordance with block 110 may modify the status value of zero or more nodes in the enterprise's Impact Graph up-stream from the node receiving the event notification. Next, the furthest up-stream node (relative to the node receiving the initial event notification) whose status value was modified in accordance with block 110 is selected as a starting point from which a down-stream analysis is performed (block 115). Down-stream analysis in accordance with block 115 may modify the impact value of zero or more nodes in the enterprise's Impact Graph down-stream from the down-stream analysis' starting node. (One of ordinary skill in the art will recognize that if there is more than one node equally distant from the node receiving the event notification and which has had its status value modified in accordance with block 110, an arbitrary one of these nodes may be selected to begin the down-stream analysis in accordance with block 115.)

With up-stream and down-stream analysis completed enterprise status, including identification of one or more root-cause failures and identification of sympathetic event notifications, may be reported (block 120). In general, those furthest up-stream nodes in the Impact Graph having a status value indicative of failure are identified as "root causes." Identified root causes may be displayed in any convenient manner to a user. For example, identified root-cause failures may be displayed graphically on a enterprise monitor console in a manner that highlights their status (e.g., shown in red). Nodes down-stream from the identified root-causes and whose impact values indicate they are impacted by the root-cause failures may also be shown to a user. It has been found beneficial, to mask event notification (e.g., alarms) associated with impacted nodes and/or to display them in a manner distinct from the root-causes. For example, impacted nodes may be shown in yellow and their event or alarm notifications moved from an "Alarm List" to an "Impacted List," both of which may be displayed to a user.

In one embodiment, status values are restricted to the Boolean values of FAILURE and NO-FAILURE and impact values are restricted to the Boolean values of IMPACTED and NOT-IMPACTED. That is, if a node's status value is true, then it is in failure and if a node's impact value is true, then it is impacted by one or more up-stream nodes. In another embodiment, either or both of a node's status and impact values may be real numbers. When real numbers are used to represent status and/or impact values (i.e., the result of evaluating inference and impact policies), one of ordinary skill in the art will recognize that a threshold function may be applied to interpret the determined status into a decision: failure/no-failure or impacted/not-impacted. For example, fuzzy logic techniques may be used to reduce real values to decision values. In yet another embodiment of the invention, either or both of a node's status and impact values may have associated attributes. For example, a node's status value may be "measured" or "inferred." A measured status value is a value obtained through a direct measurement of the monitored object. An inferred status value is a value determined through evaluation of a node's inference policy. With respect to measured and inferred values, it has been found beneficial to give a priority to measured values. For example, if a node has a measured status value of NO-FAILURE, and execution of the node's inference policy during up-stream analysis would infer a status value of FAILURE, the measured NO-FAILURE value is given precedence. That is, the node's status value is not changed.

In addition, either or both of a node's status and impact values may have an associated temporal attribute. For example, a node's status value may be allowed to "decay" over a first time period from a measured FAILURE value to an inferred FAILURE value, and from an inferred FAILURE value to an inferred NO-FAILURE value over a second time period. In addition, a measured NO-FAILURE value may be allowed to decay to an inferred NO-FAILURE value over a third time period. Similarly, a node's impact value may be allowed to "decay" from an IMPACTED value to a NOT-IMPACTED value over a fourth time period. The rate of "decay" over which status and impact values may be allowed to change will depend upon the enterprise being monitored and is a matter of design choice. In one embodiment, a node's "decay time" may relate to the underlying component's mean-time to repair. For example, if a monitored router or database application has a mean-time to repair of thirty (30) minutes, then its status value may decay from "measured failure" to "inferred failure" after thirty (30) minutes. Other user-specified time-frames may also be used. It has been found beneficial to select a time period which indicates, to the party implementing the method, that the measured and/or inferred value retains its significance. In addition, a node's inferred status may be allowed to decay in a similar fashion or, alternatively, be allowed to change from one inferred value to another based on evaluation in accordance with the invention.

Generally speaking, up-stream analysis of an Impact Graph begins at the node receiving an event notification and proceeds, in an iterative fashion, up the graph until (1) there are no more up-stream nodes; or (2) a node's status value does not change as a result of the node's inference policy; or (3) the inferred status value for a node is different from the node's measured status value.

Figure 2:
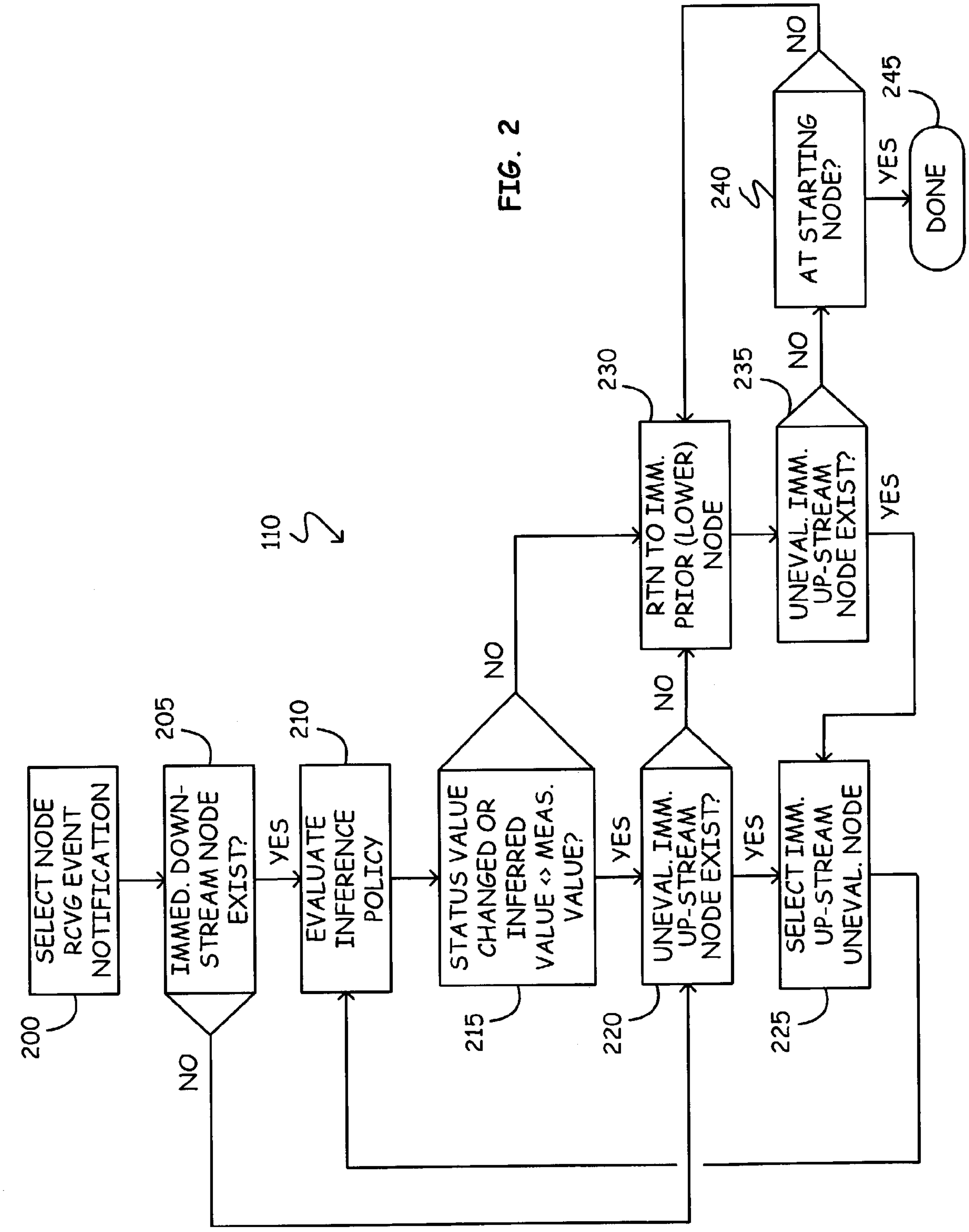
FIG. 2 shows, in flowchart form, an up-stream analysis technique in accordance with one embodiment of the invention.

An up-stream analysis flowchart in accordance with one embodiment of the invention is shown in FIG. 2. To begin, the node receiving the event notification is selected (block 200). Next, it is determined if the selected node has any immediately down-stream nodes (block 205). If it does not (the "No" prong of block 205), up-stream processing continues at block 220. If the selected node has at least one immediately down-stream node (the "Yes" prong of block 205), the node's inference policy is evaluated and its status value modified in accordance with the results thereof (block 210). If the node's status value is not changed or the newly inferred status value conflicts with the node's "measured" status value (the "No" prong of block 215), processing continues at block 230. If the node's status value is changed as a result of evaluating its inference policy and is not in conflict with the node's measured status value (the "Yes" prong of block 215), a test to determine if the selected node has any unevaluated (that is, a node whose inference policy has not yet been evaluated during the up-stream analysis) immediately up-stream nodes (block 220). If no unevaluated up-stream nodes exist (the "No" prong of block 220), processing continues at block 230. If at least one unevaluated immediately up-stream node exists (the "Yes" prong of block 220), one of the unevaluated nodes is selected (block 225), and processing continues at block 210. If the status value of the currently selected node does not change or, if changed, is in conflict with the node's measured status value as a result of the acts of block 210 (the "No" prong of block 215) or the currently selected node has no unevaluated immediately up-stream nodes (the "No" prong of block 220), that node through which the currently selected node was selected is made the "selected" node (block 230). If the newly selected node has at least one unevaluated immediately up-stream node (the "Yes" prong of block 235), processing continues at block 225. If the newly selected node does not have any unevaluated immediately up-stream node (the "No" prong of block 235), a further check is made to determine if the newly selected node is the starting node (block 240). If the newly selected node is not the starting node (the "No" prong of block 240), processing continues at block 230. If the newly selected not is the starting node (the "Yes" prong of block 240), up-stream processing is complete (block 245). The acts of blocks 210, 215, 220, 230, 235 and 225 evaluate those nodes in the up-stream path from the selected starting node (block 200) in an iterative fashion.

Generally speaking, down-stream analysis of an Impact Graph begins at the most up-stream node whose status value was changed during the up-stream analysis phase (block 110). The starting node's impact policy, and each successive immediately down-stream node's impact policy are then evaluated until (1) there are no more down-stream nodes or (2) a down-stream node's impact value does not change as a result of the evaluation.

Figure 3:
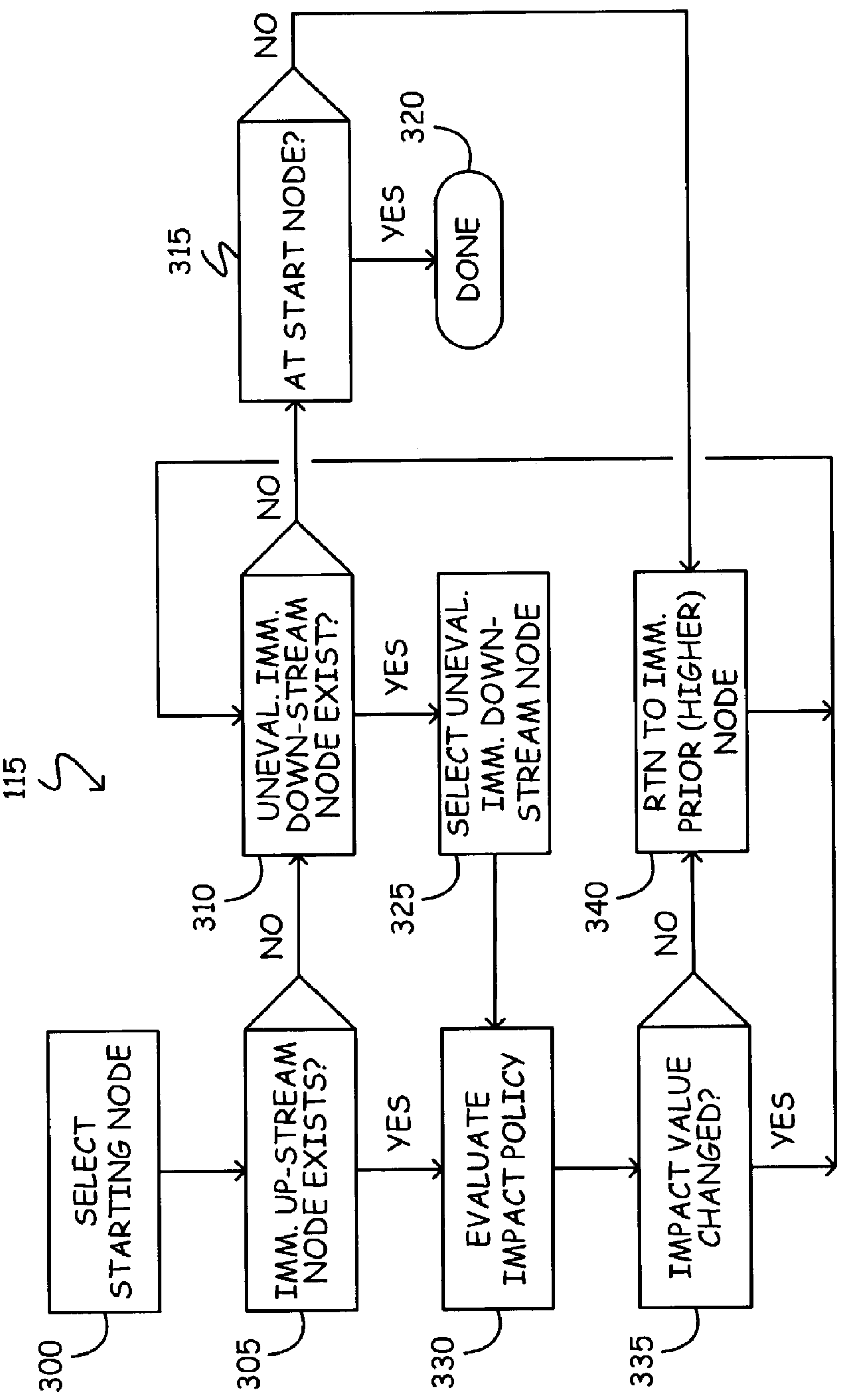
FIG. 3 shows, in flowchart form, a down-stream analysis technique in accordance with one embodiment of the invention.

A down-stream analysis flowchart in accordance with one embodiment of the invention is shown in FIG. 3. On completion of the up-stream analysis (block 110), that node that is furthest up-stream from the node receiving the event notification is selected as a starting node (block 300). If more than one node is equally distant (i.e., up-stream) from the node receiving the event notification, an arbitrary one of these nodes may be selected to begin the down-stream analysis. If the selected starting node has at least one immediately up-stream node (the "Yes" prong of block 305), down-stream processing continues at block 330. If the selected starting node does not have any immediately up-stream nodes (the "No" prong of block 305), a check is made to determine if the selected node has any unevaluated (that is, a node whose impact policy has not yet been evaluated during the down-stream analysis) immediately down-stream nodes (block 310). If the selected node has no unevaluated immediately down-stream nodes (the "No" prong of block 310), a check is made to determine if the selected node and the starting node are the same (block 315). If the selected node is not the starting node (the "No" prong of block 315), processing continues at block 340. If the selected node is the starting node (the "Yes" prong of block 315), the down-stream analysis is complete (block 320). If, on the other hand, the selected node has at least one unevaluated immediately down-stream node (the "Yes" prong of block 310), one of these nodes is made the "selected" node (block 325) and its impact policy is evaluated (block 330). If the selected node's impact value is not changed as a result of evaluating its impact policy (the "No" prong of block 335), down-stream processing of the current "branch" of the Impact Graph is complete and that node through which the currently selected node was selected is made the "selected" node (block 340) and processing continues at block 310. The acts of blocks 310, 325, 330, 335 and 340 evaluate those nodes in the down-stream path from the selected starting node (block 300) in an iterative fashion.

Figures 4A, 4B:
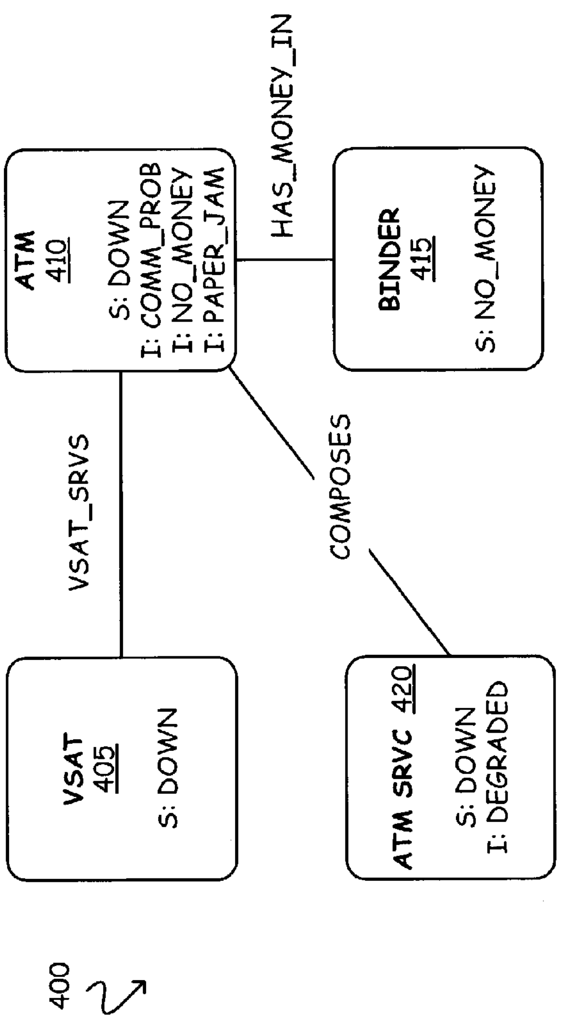
FIGS. 4A and 4B present a Management Schema in accordance with one embodiment of the invention for an illustrate ATM enterprise.

By way of example, consider an enterprise consisting of a plurality of Automatic Teller Machines (ATMs) that are coupled to a central banking facility via a satellite communications systems. Referring to FIG. 4, Management Schema 400 for a simple ATM enterprise is shown comprising VSAT object 405, ATM object 410, Binder object 415 and ATM Service object 420 (ATM SRVC). In this example, VSAT object 405 represents a satellite communications network, ATM object 410 represents a physical ATM machine, Binder object 415 represents a money dispensing mechanism (each ATM machine typically includes as many binders as types of bills that it dispenses) and ATM Service object 420 represents a logical collection of services to which one or more ATM devices may belong. As shown, VSAT 405 is coupled to ATM 410 by a VSAT_SRVS (VSAT serves) relationship, and ATM 410 is coupled to Binder 415 by a HAS_MONEY_IN relationship and to ATM Service 420 by a COMPOSES relationship. In addition, VSAT 405, ATM 410 and ATM Service 420 have associated status variables identified as DOWN. ATM 410 further has impact variables identified as COMM_PROB (communication problem), NO_MONEY and PAPER_JAM and VSAT Service 420 has an impact variable identified as DEGRADED. For convenience and ease of discussion, it is assumed that all status and impact variables are Boolean. FIG. 4B provides pseudo-code definitions for each object identified in Management Schema 400.

Referring to FIG. 5, Managed Object Inventory 500 in accordance with Management Schema 500 comprises Binders B1 505 and B2 510 coupled to ATM A1 515 via HAS_MONEY_IN relations. Similarly, Binder B1 520 is coupled to ATM A2 525 through a HAS_MONEY_IN relation. Both ATM A1 515 and ATM A2 525 are coupled to ATM Service AS1 530 and VSAT V1 535 through COMPOSES and VSAT_SRVS relations respectively. FIG. 5B provides a pseudo-code representation of Managed Object Inventory 500.

Figure 6A:
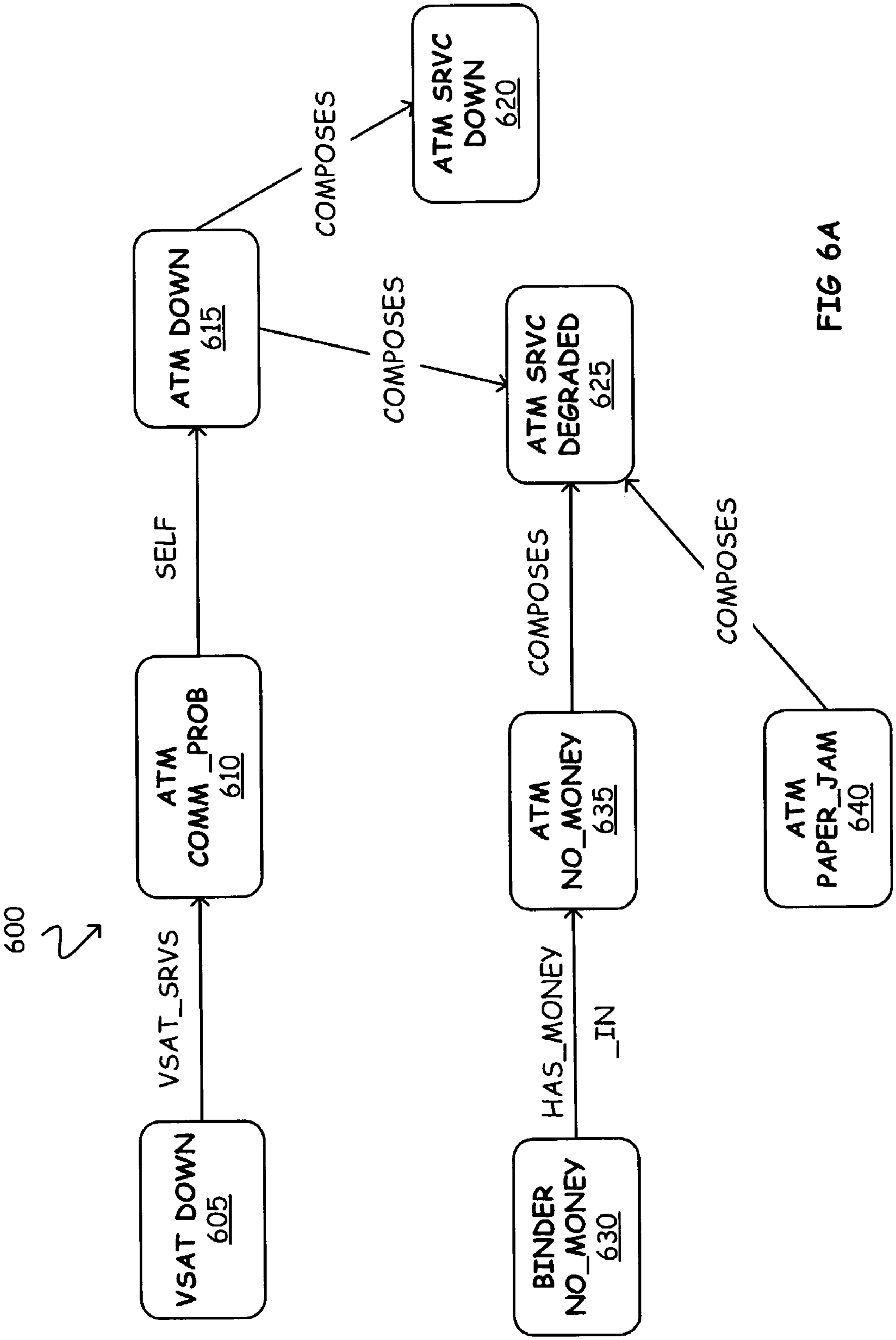

FIG. 6 illustrates Fault Model 600 in accordance with Management Schema 400 and Managed Object Inventory 500. As shown, Fault Model 600 comprises: VSAT DOWN condition node 605 coupled to ATM COMM_PROB condition node 610 by a VSAT serves relation; ATM COMM_PROB condition node 610 is coupled to ATM DOWN condition node 615 through a Self relation (where "Self" relations are an inherent relation provided in all object-oriented environments); ATM DOWN condition node 615 is coupled to ATM Service DOWN condition node 620 and ATM Service DEGRADED condition node 625 through COMPOSES relations; Binder NO_MONEY condition node 630 is coupled to ATM NO_MONEY condition node 635 through a HAS_MONEY_IN relation; and ATM NO_MONEY condition node 635 and ATM PAPER_JAM condition node 640 are coupled to ATM Service DEGRADED condition node 625 via COMPOSES relations. FIG. 6B provides a pseudo-code description of Fault Model 600, including impact and inference policies associated with the various condition nodes. For example, FIG. 6B indicates that Binder objects have an inference rule that permits a Binder object to infer that it has no money if any immediately down stream node has a status indicative of a no money condition (e.g., set the Binder object's status value to indicate the Binder has no money). In addition, FIG. 6B indicates that impact policy rules associated with ATM Service DEGRADED condition node 625 will yield a true value, indicating an ATM service degraded condition, if 30% or more of the immediately up-stream ATM nodes have a status of DOWN, or 50% or more of the immediately up-stream ATM nodes' NO_MONEY impact values are true, or 50% or more of the immediately up-stream ATM nodes' PAPER_JAM impact values are true. FIG. 6B also shows that if ATM Service DOWN condition node 620 is true, indicating an ATM service down condition, then all immediately down-stream ATM nodes are impacted. In addition, ATM NO_MONEY condition node 635 will be true, indicating an ATM is out of money, if two or more immediately up-stream Binder nodes' indicate they are out of money. Finally, FIG. 6B shows that a VSAT node will be considered to have a DOWN status if 50% or more of its immediately down-stream ATM nodes' have a status of DOWN.

Figure 7:
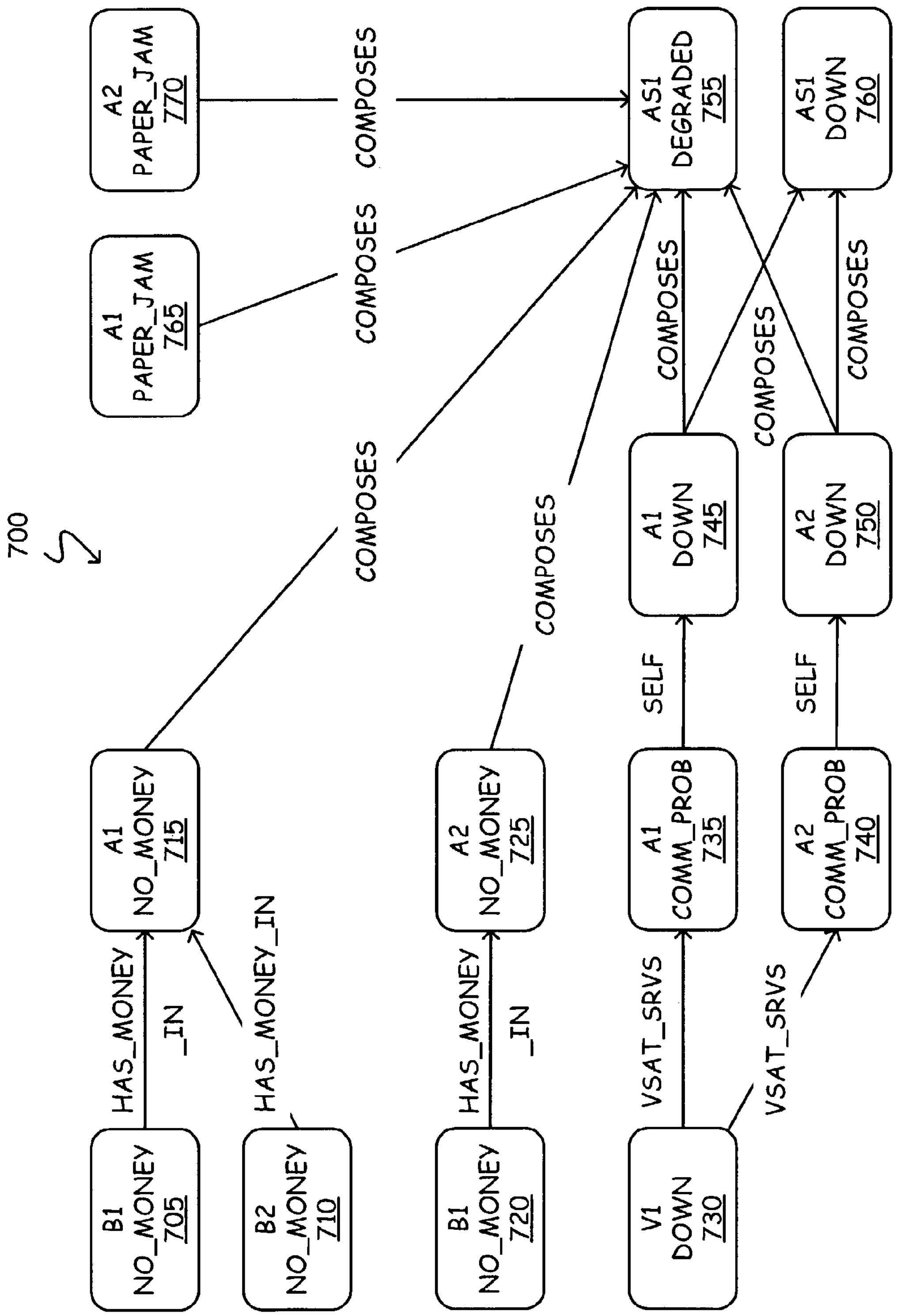
FIG. 7 shows an Impact Graph in accordance with the illustrative enterprise of FIGS. 4–6.

FIG. 7 presents Impact Graph 700 for the enterprise of FIGS. 4 through 6. As shown, Binder B1's NO_MONEY condition node 705 and Binder B2's NO_MONEY condition node 710 are coupled to ATM A1's NO_MONEY condition node 715 through the HAS_MONEY_IN relation. Similarly, Binder B1's NO_MONEY condition node 720 is coupled to ATM A2's NO_MONEY condition node 725 through a HAS_MONEY_IN relation. In addition, VSAT V1's DOWN condition node 730 is coupled to ATM A1's and ATM A2's COMM_PROB (communication problem) condition nodes 735 and 740 respectively through VSAT_SRVS (VSAT Serves) relations which in turn are coupled to ATM A1 and ATM A2 DOWN condition nodes 745 and 750 through SELF relations. Finally, ATM A1 NO_MONEY and PAPER_JAM condition nodes 715 and 765 and ATM A2 NO_MONEY and PAPER_JAM condition nodes 725 and 770 are coupled to ATM Service AS1 DEGRADED condition node by COMPOSES relations. On initialization, an enterprise's Impact Graph is generally set to the No-Failure state. That is, each node's status and impact value is set to a value indicative of no failure. In an embodiment employing Boolean status and impact values, each node's status value and each nodes impact value may be set to False. For example, in the embodiment of FIG. 7, Binder B1 NO_MONEY condition node 705 could be set to False to indicate the associated Binder currently has money and the ATM Service DEGRADED condition node 755 could be assigned a value of False to indicate that the enterprise's ATM service is currently not degraded. Once initialized, techniques in accordance with the invention wait for an alarm condition (see FIG. 1).

For the purpose of illustrating how enterprise fault monitoring and analysis in accordance with FIG. 1 may be applied to the illustrative enterprise represented by Impact Graph 700, consider an alarm event associated with ATM A1 NO_MONEY condition node 715. On receiving notice of the event (block 100), up-stream processing is performed (block 110) in accordance with FIG. 2. Accordingly, node 715 is selected (block 200) and a check is made to determine if node 715 has any immediately down-stream nodes (block 205). Because node 755 is immediately down-stream from selected node 715, node 715's inference policy is evaluated (block 210). It is noted here that because node 715 is the node that received the alarm it, by definition, has had a change in its status value (block 215). In this example, node 715's status value is measured True indicating a measured FAILURE condition. Accordingly, up-stream processing continues by determining whether selected node 715 has any unevaluated immediately up-stream nodes (block 220). In Impact graph 700, node 715 has two immediately up-stream nodes, Binder B1 and Binder B2 NO_MONEY condition nodes 705 and 710. An arbitrary one of these nodes, say node 705, is selected (block 225) and its inference policy is evaluated (block 210). In accordance with FIG. 6B, node 705's status is inferred to be true because its immediately down-stream node (node 715) has a status indicative of the NO_MONEY condition. Thus, node 705's status value is changed to True (block 215) and a check is made to determine if selected node 705 has any unevaluated immediately up-stream nodes (block 220). Because node 705 has no immediately up-stream nodes, processing returns to that node that was selected immediately prior to node 705—node 715 (block 230). Again, a check is made to determine if selected node 715 has any unevaluated immediately up-stream nodes (block 235) and, because it does (block 220), the previously unselected and unevaluated node 710 is selected (block 225) and it's inference policy is evaluated (block 210). Node 710 has its status value adjusted in accordance with its associated inference policy (block 215) and, eventually, processing returns to node 715 (block 230). This time, node 715 has no unevaluated immediately up-stream nodes (block 235) and is further determined to be the starting node—the node receiving the initial alarm notification (block 240)—so that up-stream processing is complete (block 245). In summary, event notification caused the status value of node 715 to be measured True and up-stream processing caused the status value of nodes 705 and 710 to be inferred true. Where a "True" status value indicates a FAILED status.

Next, down-stream processing is performed (block 115) in accordance with FIG. 3. To begin, a starting node is selected that (1) has had its status value changed during the up-stream analysis of block 110 and (2) is maximally up-stream from the node receiving the original event notification (that is, node 715). In the current example, both node 705 and 710 meet these criteria. An arbitrary one of these nodes is selected for initial processing, say node 705 (block 300). A check is then made to determine if selected node 705 has any immediately up-stream nodes (block 305). Because node 705 has no immediately up-stream nodes, a second check is made to determine if selected node 705 has any unevaluated immediately down-stream nodes (block 310). Because unevaluated (within the context of the ongoing down-stream analysis) node 715 is immediately down-stream from selected node 705, node 715 is selected (block 325). In accordance with the impact policy shown in FIG. 6B, node 715's impact value is modified to indicate it is impacted (e.g., node 715's impact value is set to True) because at least two of its up-stream Binder objects indicate they have no money (block 330). The changed impact value (block 335) causes a check to determine if selected node 715 has an unevaluated immediately down-stream node (block 310). Since node 755 is both immediately down-stream and unevaluated, it is selected (block 325) and its impact policy is evaluated (block 330). In accordance with the impact policy shown in FIG. 6B, node 755's impact value is modified to indicate it is impacted (e.g., node 755's impact value is set to True) because at least fifty percent of its up-stream ATM objects indicate they have no money (block 335). A further check is then performed to determine if selected node 755 has any unevaluated immediately down-stream nodes (block 310) and because it does not, and is further determined not to be the node selected at down-stream processing initiation (block 315), that immediately higher node through which node 755 was selected is selected—node 715 (block 340). Processing continues at blocks 310, 315 and 340 until originally selected node 705 is again selected indicating that down-stream processing of node 705 is complete. Because both nodes 705 and 710 meet the selection criteria for down-stream processing, node 710 is now selected and processed in accordance with FIG. 3. In summary, down-stream processing caused the impact values for nodes 705, 710, 715 and 755 to be modified to true.

Results from the two-phase enterprise analysis technique in accordance with FIG. 1 may now be reported (block 120). As indicated above, the most up-stream nodes having a status value indicative of failure are identified as the "root cause" of the alarm event, while those nodes down-stream from the identified root cause nodes having impact values indicative of impact are identified as impacted. Accordingly, nodes 705 and 710 are identified as the root cause of the alarm received at node 715 while nodes 715 and 755 are indicated as impacted. In one embodiment, nodes identified as root causes may be displayed to a user in a first manner and nodes identified as impacted in a second manner. For example, an alarm condition may be shown for nodes identified as root causes and alarms for nodes impacted (but not root causes) may have their alarms masked. Thus, while node 715 was initially in alarm, enterprise analysis in accordance with FIG. 1 allows nodes 705 and 710 to be identified as the true culprits behind the alarm while also allowing other alarms (e.g., those associated with nodes 715 and 755) to be masked, thereby reducing or eliminating the effect of alarm storms in highly interconnected enterprises.

As previously mentioned, status and/or impact values may also be non-Boolean. In these embodiments, the individual status and impact values be interpreted by a function during the reporting acts of block 120. For example, if status and/or impact values were allowed to be any real number between 0.00 and 1.00, a status value of 0.51 could be "filtered" to determine if that value reflected a Failed status. The precise "filter" is a matter of design choice and could be, for example, based on a Bayesian failure analysis, fuzzy logic, or prior use mean-time-to-failure analysis.

It will be recognized by one of ordinary skill in the art that methods and devices in accordance with the invention do not require the use of separate Management Schema, Managed Object Instances, Fault Models and Impact Graphs. Any enterprise modeling technique that characterizes monitored components in a graph-like structure may benefit from the use of inference and impact policies and a two-phase approach to analysis as described herein. For example, object-oriented characterizations of enterprise components are not required by the method of FIG. 1. That is, managed components (the enterprise) may be described in terms of specific elements that are "hard coded" to reflect their organization and allowable fault characteristics.

Various changes in the details of the illustrated operational methods are possible without departing from the scope of the claims. For instance, the enterprise illustrated in FIGS. 4–7 was introduced merely for explanatory purposes and is not intended to limit, in any way, the generality of the method of FIG. 1. In addition, acts in accordance with FIGS. 1–3 may be performed by a programmable control device executing instructions organized into a program module. A programmable control device may be a single computer processor, a plurality of computer processors coupled by a communications link, or a custom designed state machine. Custom designed state machines may be embodied in a hardware device such as a printed circuit board comprising discrete logic, integrated circuits, or specially designed application specific integrated circuits (ASICs). Storage devices suitable for tangibly embodying program instructions include all forms of non-volatile memory including, but not limited to: semiconductor memory devices such as electrically programmable read-only memory (EPROM), electrically erasable programmable read-only memory (EEPROM), and flash devices; magnetic disks (fixed, floppy, and removable); other magnetic media such as tape; and optical media such as CD-ROM disks.

In still other embodiments, the system being monitored is not a computer network. For example, a mechanical system comprising pumps, valves and motors may benefit from the claimed fault analysis method. One of ordinary skill in the art will recognize that if a "system" comprises at least some components that are monitored and these monitored components communicate (in any desired fashion) to a module that performs the analysis, such a system can benefit from the claimed invention.

While the invention has been disclosed with respect to a limited number of embodiments, numerous modifications and variations will be appreciated by those skilled in the art. It is intended, therefore, that the following claims cover all such modification and variation that may fall within the true sprit and scope of the invention.

What is claimed is:

1. An enterprise fault analysis method, wherein at least a portion of the enterprise is represented by a enterprise-specific fault model having a plurality of nodes, comprising:

receiving an event notification for a first node in the fault model;

performing an up-stream analysis of the fault model beginning at the first node;

identifying a second node, the second node having a status value modified during the up-stream analysis to indicate a failed status;

performing a down-stream analysis of the fault model beginning at the second node;

identifying those nodes in a contiguous path between the second node and the first node in the fault model whose impact values indicate an impacted performance condition in accordance with the down-stream analysis;

reporting the second node as a root cause of the received event notification; and reporting at least one of the identified nodes as impacted by the root cause of the received event notification and not as root causes of the received event notification.

2. The method of claim 1, wherein the enterprise-specific fault model comprises an Impact Graph.

3. The method of claim 1, wherein the act of performing an up-stream analysis comprises:

evaluating an inference policy associated with the first node and setting a status value associated with the first node in accordance therewith; and evaluating inference policies associated with up-stream nodes to the first node and setting a status value associated with each evaluated up-stream node in accordance therewith.

4. The method of claim 3, wherein the act of evaluating inference polices is terminated when no up-stream nodes from the last evaluated node exist.

5. The method of claim 4, wherein the act of evaluating inference policies is further terminated when a status value associated with a node does not change based on evaluation of an inference policy associated with the node.

6. The method of claim 4, wherein the act of evaluating inference policies is further terminated when a status value associated with a node is a measured status value.

7. The method of claim 3, wherein the status value associated with a node comprises a Boolean value.

8. The method of claim 3, wherein the status value associated with a node comprises a real-number value.

9. The method of claim 3, wherein a status value associated with a node further has one or more associated attributes.

10. The method of claim 9, wherein one of the one or more associated attributes comprises a temporal attribute.

11. The method of claim 9, wherein one of the one or more associated attributes comprises an indication to identify the status value as being a measured value or an inferred value.

12. The method of claim 1, wherein the act of identifying a second node further comprises identifying one or more nodes that are most up-stream from the first node.

13. The method of claim 12 further comprising identifying, as the second node, an arbitrary one of the one or more identified nodes.

14. The method of claim 1, wherein the act of performing a down-stream analysis comprises:

evaluating an impact policy associated with the second node and setting an impact value associated with the second node in accordance therewith; and evaluating impact policies associated with down-stream nodes to the second node and setting an impact value associated with each evaluated down-stream node in accordance therewith.

15. The method of claim 14, wherein the act of evaluating impact policies is terminated when no down-stream nodes from the last evaluated node exist.

16. The method of claim 15, wherein the act of evaluating impact policies is further terminated when an impact value associated with a node does not change based on evaluation of an impact policy associated with the node.

17. The method of claim 14, wherein the impact value associated with a node comprises a Boolean value.

18. The method of claim 14, wherein the impact value associated with a node comprises a real-number value.

19. The method of claim 14, wherein an impact value associated with a node further has one or more associated attributes.

20. The method of claim 19, wherein one of the one or more associated attributes comprises a temporal attribute.

21. The method of claim 1, wherein the act of reporting the second node as a root cause comprises visually displaying an alarm condition for said second node to a user.

22. The method of claim 1, wherein the act of reporting at least some of the identified nodes as impacted by the root cause comprises visually identifying the at east one of the identified nodes differently from the second node.

23. The method of 22, further comprising filtering event notifications received by at least one of the identified nodes so as to not report said event notification to a user as a root cause failure.

24. A program storage device, readable by a programmable control device, comprising instructions stored on the program storage device for causing the programmable control device to:

receive an event notification from a first node, said first node one of a plurality of nodes in an enterprise-specific fault model;

perform an up-stream analysis of the fault model beginning at the first node;

identify a second node, the second node having a status value modified during the up-stream analysis to indicate a failed status;

perform a down-stream analysis of the fault model beginning at the second node;

identify those nodes in a contiguous path between the second node and the first node in the fault model whose impact values indicate an impacted performance condition in accordance with the down-stream analysis;

report the second node as a root cause of the received event notification; and report at least one of the identified nodes as impacted by the root cause of the received event notification and not as mat causes of the received event notification.

25. The program storage device of claim 24, wherein the enterprise-specific fault model comprises an Impact Graph.

26. The program storage device of claim 24, wherein the instructions to perform an up-stream analysis comprise instructions to:

evaluate an inference policy associated with the first node and set a status value associated with the first node in accordance therewith; and evaluate inference policies associated with up-stream nodes to the first node and set a status value associated with each evaluated up-stream node in accordance therewith.

27. The program storage device of claim 26, wherein the instructions to evaluate inference policies stop evaluating up-stream nodes when no up-stream node from the last evaluated node exists.

28. The program storage device of claim 27, wherein the instructions to evaluate inference policies stop evaluating up-stream nodes when a status value associated with a node does not change based on evaluation of an inference policy associated with the node.

29. The program storage device of claim 27, wherein the instructions to evaluate inference policies stop evaluating up-stream nodes when a status value associated with a node is a measured status value.

30. The program storage device of claim 26, wherein the status value associated with a node comprises a Boolean value.

31. The program storage device of claim 26, wherein the status value associated with a node comprises a real-number value.

32. The program storage device of claim 26, wherein a status value associated with a node further has one or more associated attributes.

33. The program storage device of claim 32, wherein one of the one or more associated attributes comprises a temporal attribute.

34. The program storage device of claim 32, wherein one of the one or more associated attributes comprises an indication to identify the status value as being a measured value or an inferred value.

35. The program storage device of claim 24, wherein the instructions to identify a second node further comprise instructions to identify one or more nodes that are most up-stream from the first node.

36. The program storage device of claim 35 further comprising instructions to identify, as the second node, an arbitrary one of the one or more identified nodes.

37. The program storage device of claim 24, wherein the instructions to perform a down-stream analysis comprise instructions to:

evaluate an impact policy associated with the second node and set an impact value associated with the second node in accordance therewith; and evaluate impact policies associated with down-stream nodes to the second node and set an impact value associated with each evaluated down-stream node in accordance therewith.

38. The program storage device of claim 37, wherein the instructions to evaluate impact policies stop evaluating when no down-stream nodes from the last evaluated node exists.

39. The program storage device of claim 38, wherein the instructions to evaluate impact policies is further terminated when an impact value associated with a node does not change based on evaluation of an impact policy associated with the node.

40. The program storage device of claim 37, wherein the impact value associated with a node comprises a Boolean value.

41. The program storage device of claim 37, wherein the impact value associated with a node comprises a real-number value.

42. The program storage device of claim 37, wherein an impact value associated with a node further has one or more associated attributes.

43. The program storage device of claim 42, wherein one of the one or more associated attributes comprises a temporal attribute.

44. The program storage device of claim 24, wherein the instructions to report the second node as a root cause of the received event notification comprise instructions to visually display an alarm condition for said second node to a user.

45. The program storage device of claim 24, wherein the instructions to report at least some of the identified nodes as impacted by the root cause of the received event notification comprise instructions to visually identify the at least one of the identified nodes differently from the second node.

46. The program storage device of claim 45, further comprising instructions to filter event notifications received by at least one of the identified nodes so as to not report said event notification to a user as a root cause failure.

47. An enterprise including a plurality of operatively coupled monitored components, hereinafter referred to as nodes, comprising:

a first node adapted to generate an event notification message, said first node one of a plurality of nodes in an enterprise-specific fault model; and a monitor agent operatively coupled to the first node and adapted to receive the event notification message, the monitor agent further adapted to:

perform an up-stream analysis of the fault model beginning at the first node;

identify a second node, the second node having a status value modified during the up-stream analysis to indicate a failed status;

perform a down-stream analysis of the fault model beginning at the second node;

identify those nodes in a contiguous path between the second node and the first node in the fault model whose impact values indicate an impacted performance condition in accordance with the down-stream analysis;

report the second node as a root cause of the received event notification; and report at least one of the identified nodes as impacted by the root cause of the received event notification and not as root causes of the received event notification.

48. The enterprise of claim 47, wherein operatively coupled monitored components comprise software applications executing on a computer system.

49. The enterprise of claim 47, wherein operatively coupled monitored components comprise hardware devices for facilitating communication between one or more of the operatively coupled monitored components.

50. The enterprise of claim 47, wherein the enterprise-specific fault model comprises an Impact Graph.

51. The enterprise of claim 47, wherein the monitor agent is further adapted to, during said up-stream analysis:

evaluate an inference policy associated with the first node and set a status value associated with the first node in accordance therewith; and evaluate inference policies associated with up-stream nodes to the first node and set a status value associated with each evaluated up-stream node in accordance therewith.

52. The enterprise of claim 47, wherein the monitor agent is further adapted to, during said down-stream analysis:

evaluate an impact policy associated with the second node and set an impact value associated with the second node in accordance therewith; and evaluate impact policies associated with down-stream nodes to the second node and set an impact value associated with each evaluated down-stream node in accordance therewith.

53. The enterprise of claim 47, wherein the monitor agent is further adapted to report the second node as a root cause of the received event notification by visually displaying an alarm condition for said second node to a user.

54. The enterprise of claim 47, wherein the monitor agent is further adapted to report at least some of the identified nodes as impacted by the root cause of the received event notification comprise instructions to visually identify the at least one of the identified nodes differently from the second node.

55. The enterprise of claim 54, wherein the monitor agent is further adapted to filter event notifications received by at least one of the identified nodes so as to not report said event notification to a user as a root cause failure.

56. A fault analysis method, wherein at least a portion of a system is represented by a system-specific fault model having a plurality of nodes, comprising:

receiving an event notification for a first node in the fault model;

performing an up-stream analysis of the fault model beginning at the first node;

identifying a second node, the second node having a status value modified during the up-stream analysis to indicate a failed status;

performing a down-stream analysis of the fault model beginning at the second node;

identifying those nodes in a contiguous path between the second node and the first node in the fault model whose impact values indicate an impacted performance condition in accordance with the down-stream analysis;

reporting the second node as a root cause of the received event notification; and reporting at least one of the identified nodes as impacted by the root cause of the received event notification and not as root causes of the received event notification.

57. The method of claim 56, wherein the system-specific fault model comprises an Impact Graph.

58. The method of claim 56, wherein the act of performing an up-stream analysis comprises:

evaluating an inference policy associated with the first node and setting a status value associated with the first node in accordance therewith; and evaluating inference policies associated with up-stream nodes to the first node and setting a status value associated with each evaluated up-stream node in accordance therewith.

59. The method of claim 58, wherein the status value associated with a node comprises a Boolean value.

60. The method of claim 58, wherein the status value associated with a node comprises a real-number value.

61. The method of claim 58, wherein a status value associated with a node further has one or more associated attributes.

62. The method of claim 61, wherein one of the one or more associated attributes comprises a temporal attribute.

63. The method of claim 61, wherein one of the one or more associated attributes comprises an indication to identify the status value as being a measured value or an inferred value.

64. The method of claim 58, wherein the act of evaluating inference policies is terminated when no up-stream nodes from the last evaluated node exist.

65. The method of claim 64, wherein the act of evaluating inference policies is further terminated when a status value associated with a node does not change based on evaluation of an inference policy associated with the node.

66. The method of claim 64, wherein the act of evaluating inference policies is further terminated when a status value associated with a node is a measured status value.

67. The method of claim 56, wherein the act of identifying a second node further comprises identifying one or more nodes that are most up-stream from the first node.

68. The method of claim 67 further comprising identifying, as the second node, an arbitrary one of the one or more identified nodes.

69. The method of claim 56, wherein the act of performing a down-stream analysis comprises:

evaluating an impact policy associated with the second node and setting an impact value associated with the second node in accordance therewith; and evaluating impact policies associated with down-stream nodes to the second node and setting an impact value associated with each evaluated down-stream node in accordance therewith.

70. The method of claim 69, wherein the act of evaluating impact policies is terminated when no down-stream nodes from the last evaluated node exist.

71. The method of claim 70, wherein the act of evaluating impact policies is further terminated when an impact value associated with a node does not change based on evaluation of an impact policy associated with the node.

72. The method of claim 69, wherein the impact value associated with a node comprises a Boolean value.

73. The method of claim 69, wherein the impact value associated with a node comprises a real-number value.

74. The method of claim 69, wherein an impact value associated with a node further has one or more associated attributes.

75. The method of claim 74, wherein one of the one or more associated attributes comprises a temporal attribute.

76. The method of claim 56, wherein the act of reporting the second node as a root cause comprises visually displaying an alarm condition for said second node to a user.

77. The method of claim 56, wherein the act of reporting at least some of the identified nodes as impacted by the root cause comprises visually identifying the at least one of the identified nodes differently from the second node.

78. The method of 77, further comprising filtering event notifications received by at least one of the identified nodes so as to not report said event notification to a user as a root cause failure.

79. A fault analysis method, wherein at least a portion of a system is represented by a fault model having a plurality of nodes, comprising:

receiving an event notification associated with a first node in the fault model;

performing an up-stream analysis of the fault model beginning at the first node;

identifying a second node having a status value that was modified during the up-stream analysis to indicate a failed status;

performing a down-stream analysis of the fault model beginning at the second node;

identifying nodes in a contiguous path between the second node and the first node in the fault model whose impact values indicate an impacted performance condition in accordance with the down-stream analysis; and indicating the second node as a root cause of the received event notification.

80. The method of claim 79, wherein the act of indicating comprises generating a graphical display indicating the second node as the root cause of the received event notification.

81. The method of claim 79, wherein the act of indicating comprises making an entry in a log file indicating the second node as a root cause of the received event notification.

82. The method of claim 81, wherein the log file comprises a database.

83. The method of claim 79, further comprising indicating at least one of the identified nodes in a contiguous path between the second node and the first node as impacted by the root cause of the received event notification and not as root causes of the received event notification.

84. The method of 83, further comprising filtering event notifications received by at least one of the identified nodes so as to not report said event notification to a user as a root cause failure.

85. The method of claim 83, wherein the act of indicating comprises generating a graphical display indicating the at least one identified node as being impacted by the received event notification.

86. The method of claim 85, wherein the act of indicating comprises making an entry in a log file indicating the at least one identified node as being impacted by the received event notification.

87. The method of claim 86, wherein the log file comprises a database.

88. The method of claim 79, wherein the act of performing an up-stream analysis comprises:

evaluating an inference policy associated with the first node and setting a status value associated with the first node in accordance therewith; and evaluating inference policies associated with up-stream nodes to the first node and setting a status value associated with each evaluated up-stream node in accordance therewith.

89. The method of claim 79, wherein the act of performing a down-stream analysis comprises:

evaluating an impact policy associated with the second node and setting an impact value associated with the second node in accordance therewith; and evaluating impact policies associated with down-stream nodes to the second node and setting an impact value associated with each evaluated down-stream node in accordance therewith.

90. A program storage device, readable by a programmable control device, comprising instructions stored on the program storage device for causing the programmable control device to execute the method of claim 79.

* * * * *